United States Patent
Zhao et al.

(10) Patent No.: US 12,391,146 B2
(45) Date of Patent: Aug. 19, 2025

(54) METHODS AND SYSTEM FOR THERMAL MANAGEMENT OF AN ELECTRIC ENERGY STORAGE DEVICE

(71) Applicant: Ford Global Technologies, LLC, Dearborn, MI (US)

(72) Inventors: Yanan Zhao, Ann Arbor, MI (US); Xiaohong Duan, Canton, MI (US); Angel Porras, Dearborn, MI (US); Julia Helen Buckland Seeds, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 412 days.

(21) Appl. No.: 17/449,153

(22) Filed: Sep. 28, 2021

(65) Prior Publication Data
US 2023/0094431 A1     Mar. 30, 2023

(51) Int. Cl.
*B60L 58/00*     (2019.01)
*B60L 58/26*     (2019.01)

(52) U.S. Cl.
CPC .......... *B60L 58/26* (2019.02); *B60L 2240/10* (2013.01)

(58) Field of Classification Search
CPC ................ B60L 58/26; B60L 2240/10; B60L 2240/545; B60L 2260/54; B60L 2240/622; B60L 1/02; Y02T 10/70
See application file for complete search history.

(56) References Cited

U.S. PATENT DOCUMENTS

| | | | |
|---|---|---|---|
| 8,030,883 B2 | 10/2011 | Katayama | |
| 10,780,885 B2 | 9/2020 | Marcicki | |
| 2017/0080821 A1* | 3/2017 | Hughes | .................. B60L 58/25 |
| 2017/0101030 A1* | 4/2017 | Hughes | ............... B60R 16/0236 |
| 2018/0170207 A1* | 6/2018 | Ko | .......................... B60L 58/26 |
| 2019/0217721 A1 | 7/2019 | Marcicki et al. | |
| 2019/0245170 A1* | 8/2019 | Brinkmann | ......... H01M 50/204 |
| 2019/0292973 A1* | 9/2019 | Jiang | ........................ F01P 7/14 |
| 2019/0389452 A1* | 12/2019 | Duan | .................... B60W 10/30 |
| 2020/0231023 A1 | 7/2020 | Sathasivam et al. | |
| 2020/0247386 A1* | 8/2020 | Dudar | ................... B60W 10/24 |
| 2020/0338959 A1 | 10/2020 | Carlson et al. | |
| 2021/0190867 A1* | 6/2021 | Fan | .................... G01R 31/3842 |
| 2022/0355697 A1* | 11/2022 | Wiebenga | ............... B60L 58/24 |

OTHER PUBLICATIONS

Hariharan, A. et al., "Cooling Method and System," U.S. Appl. No. 17/185,296, filed Feb. 25, 2021, 46 pages.

* cited by examiner

*Primary Examiner* — Khoi H Tran
*Assistant Examiner* — Tien Minh Le
(74) *Attorney, Agent, or Firm* — David Kelley; McCoy Russell LLP

(57) ABSTRACT

Methods and systems for controlling a temperature of an electric energy storage device of via a cooling device are disclosed. In one example, a temperature of an electric energy storage device may be permitted to increase when a vehicle is within a threshold distance of an expected parking location of the vehicle so that less electrical energy of the electric energy storage device may be consumed.

16 Claims, 6 Drawing Sheets

METHODS AND SYSTEM FOR THERMAL MANAGEMENT OF AN ELECTRIC ENERGY STORAGE DEVICE

FIELD

The present description relates generally to methods and systems for controlling cooling of an electric energy storage device, such as a battery. The methods and systems may be particularly useful for electric energy storage devices that are included in vehicles.

BACKGROUND/SUMMARY

Plug-in hybrid vehicles and electric vehicles include electric energy storage devices, such as batteries, to provide electric energy that may be applied by an electric machine to propel a vehicle. The electric energy storage device may output a rated power level when the electric energy storage device is operated within a particular temperature range. If the temperature of the electric energy storage devices increases to a level that is outside of the particular temperature range, output power of the electric energy device may be cut-off or reduced. One way to maintain a temperature of the electric energy storage device in the particular temperature range may be to cool the electric machine with a cooling device. The electric machine may simultaneously provide electric power to the electric machine that propels the vehicle and to a compressor or pump of the cooling device. Thus, if the electric energy storage device is cooled via the cooling device, the driving range of the vehicle may be reduced. Consequently, it may be desirable to provide a way of maintaining the electric energy storage device within the particular temperature range while reducing electric power used to cool the electric energy storage device.

The inventors herein have recognized the above-mentioned issues and have developed a method for cooling an electric energy storage device, comprising: adjusting cooling of the electric energy storage device via a controller in response to an estimated distance between a vehicle and an expected parking location of the vehicle.

By cooling an electric energy storage device in response to an estimated distance between a vehicle and an expected parking location of the vehicle, it may be possible to provide the technical result of maintaining a temperature of an electric energy storage device within a desired range while lowering consumption of electric power to cool the electric energy storage device. Specifically, as a vehicle approaches an expected parking location for the vehicle, cooling capacity of a cooling system that cools the electric energy storage device may be reduced, thereby conserving electric power that is sourced from the electric energy storage device. In addition, since the vehicle is close to its parking location, the electric energy storage device temperature may not have time increase beyond a threshold level so that electric energy storage device output may be maintained.

The present description may provide several advantages. In particular, the approach may reduce electrical power consumption in a vehicle. Further, the approach may maintain electric energy storage device temperature within a desired range. In addition, the approach may also estimate a temperature of an electric energy storage device at a time that a vehicle that includes the electric energy storage device exits park and begins to travel.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
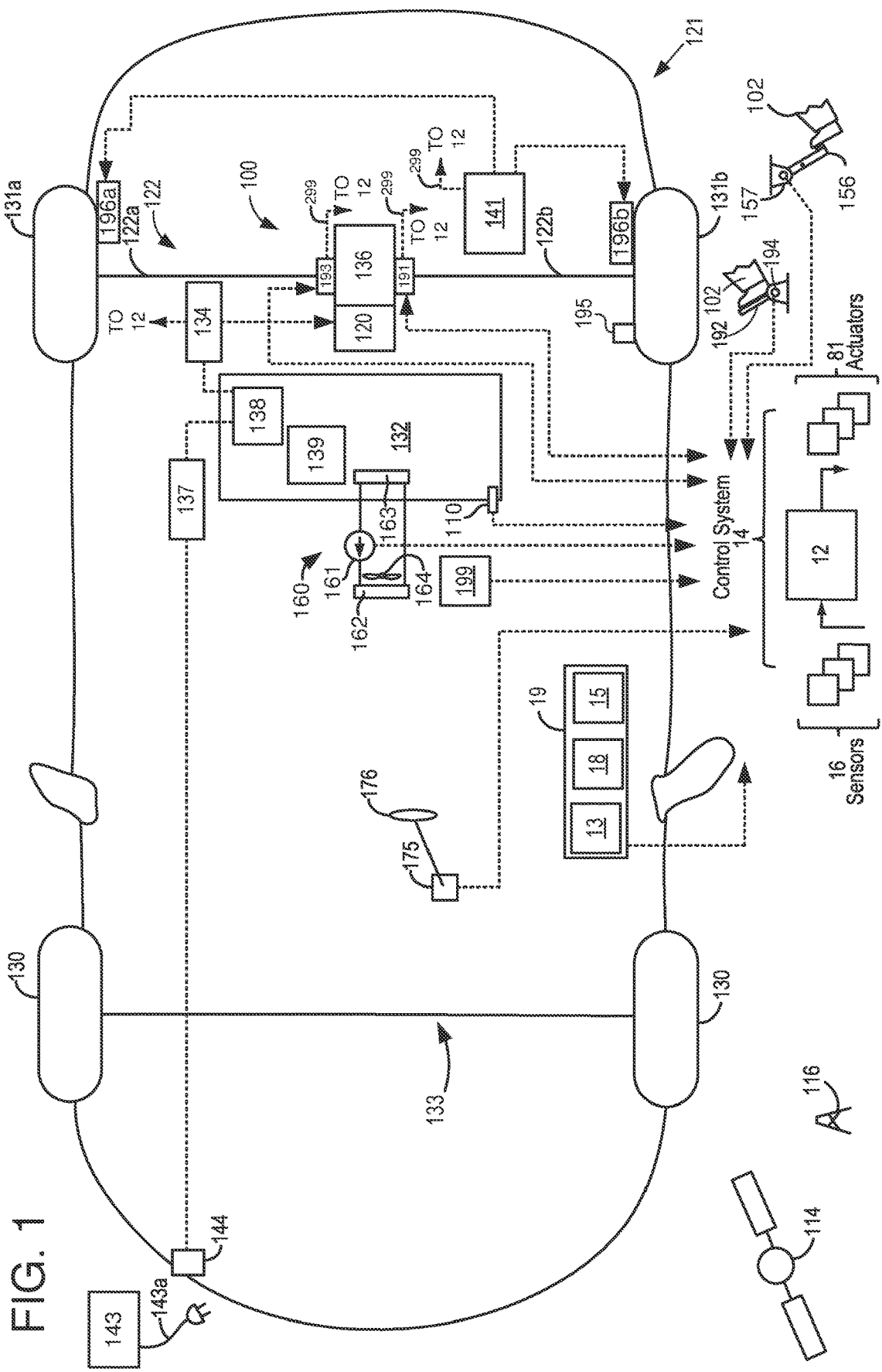
FIG. 1 is a schematic diagram of a first example vehicle driveline.
Figure 2:
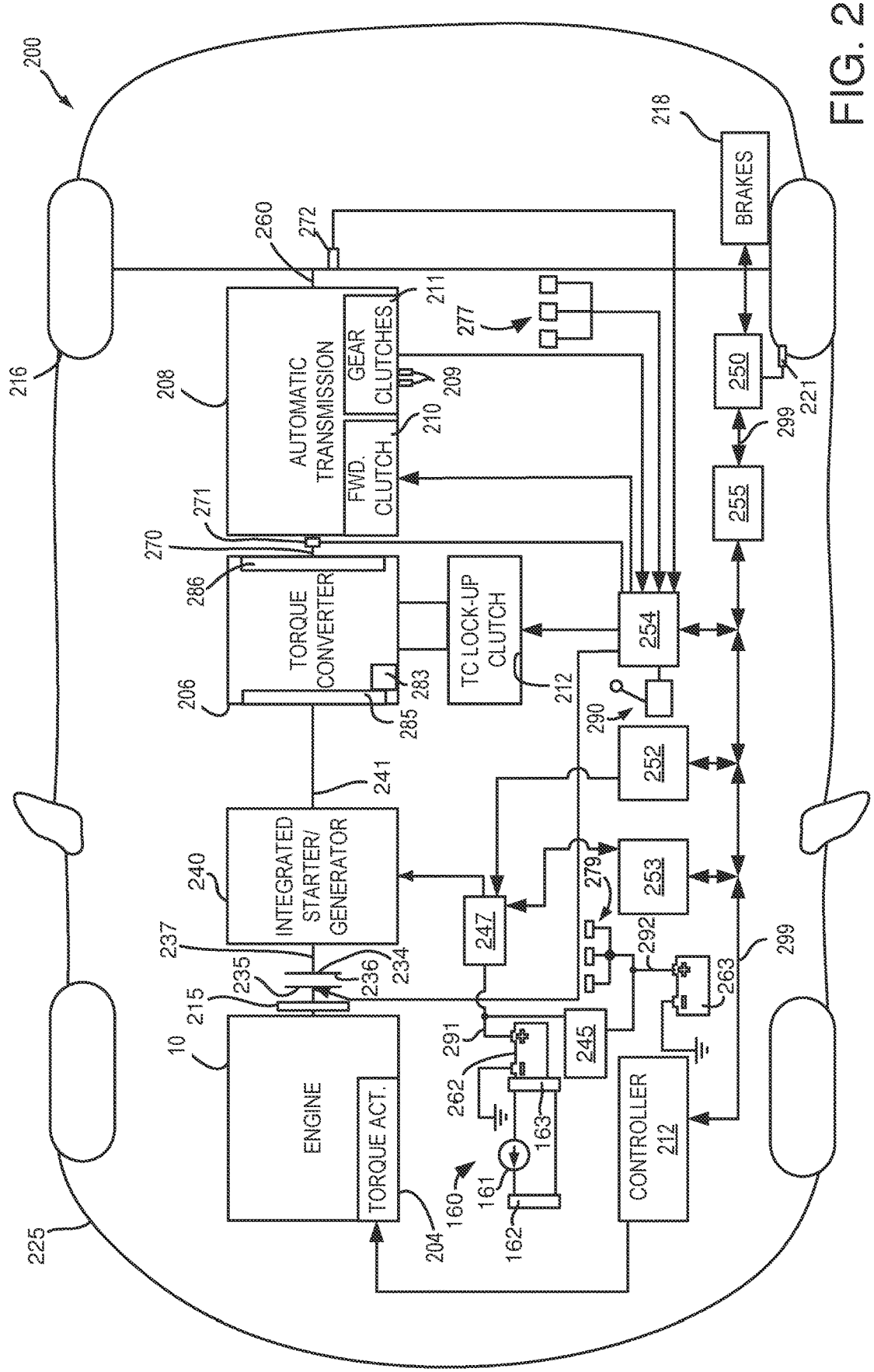
FIG. 2 is a schematic diagram of a second example vehicle driveline.
Figure 3:
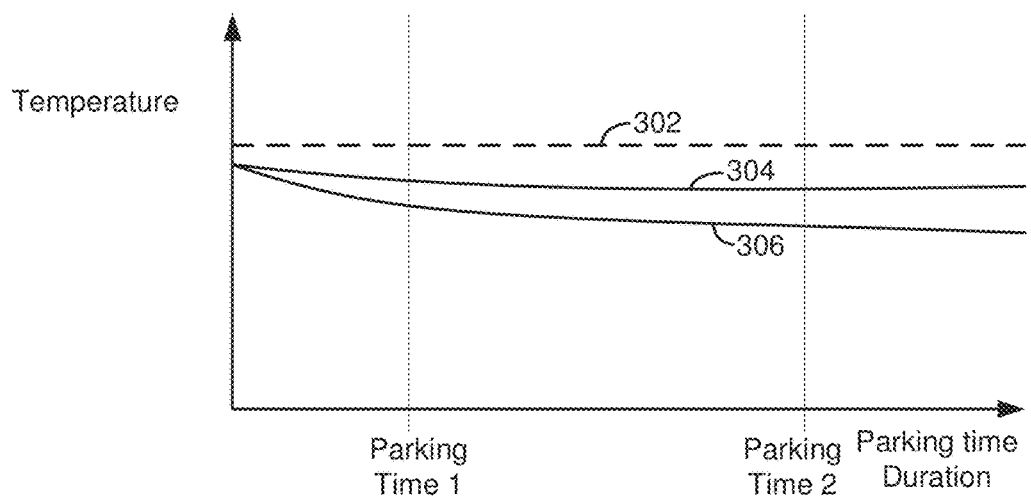
FIG. 3 is a plot of an example electric energy storage device temperature profile.
Figure 4:
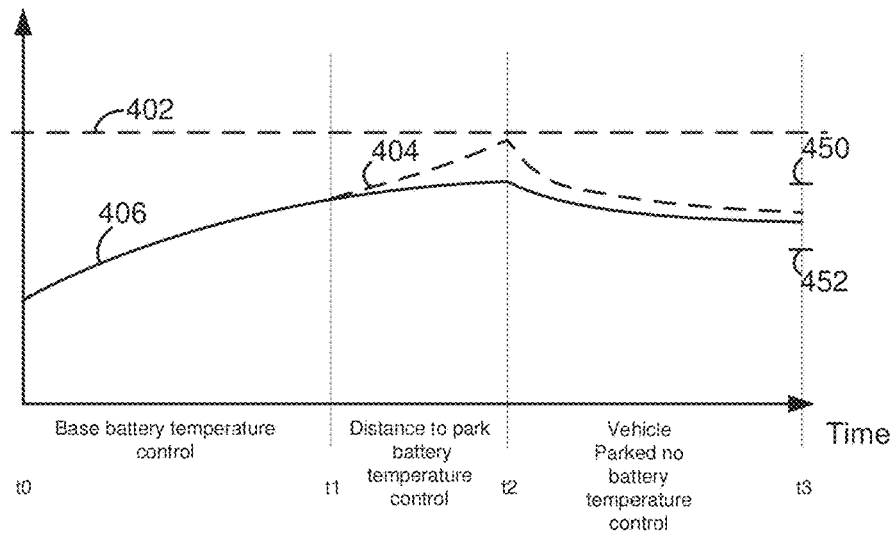
FIG. 4 is a plot showing how the method of FIGS. 6-8 may modify electric energy storage device temperature to reduce electric power consumption while maintaining a temperature of the electric energy storage device within a desired range.
Figure 5:
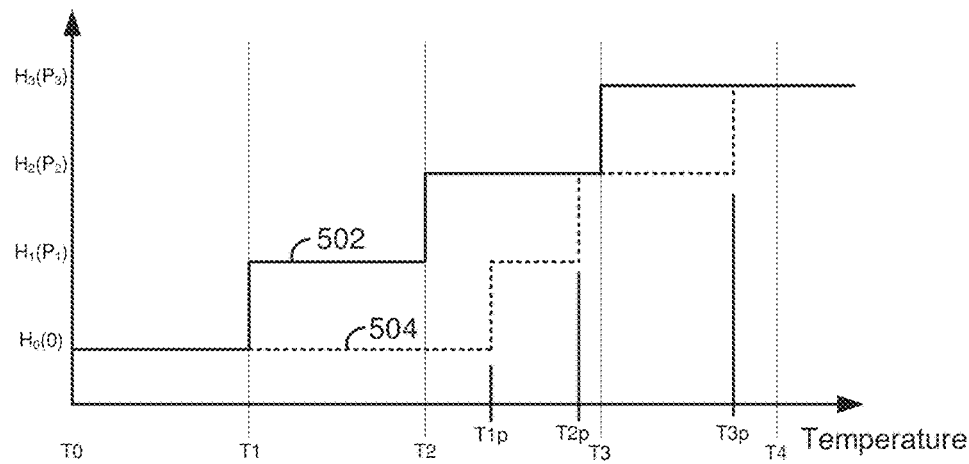
FIG. 5 is a plot showing method 1 according to FIGS. 6-8 where a calibration change may be performed to control temperature of an electric energy storage device.
Figure 6:
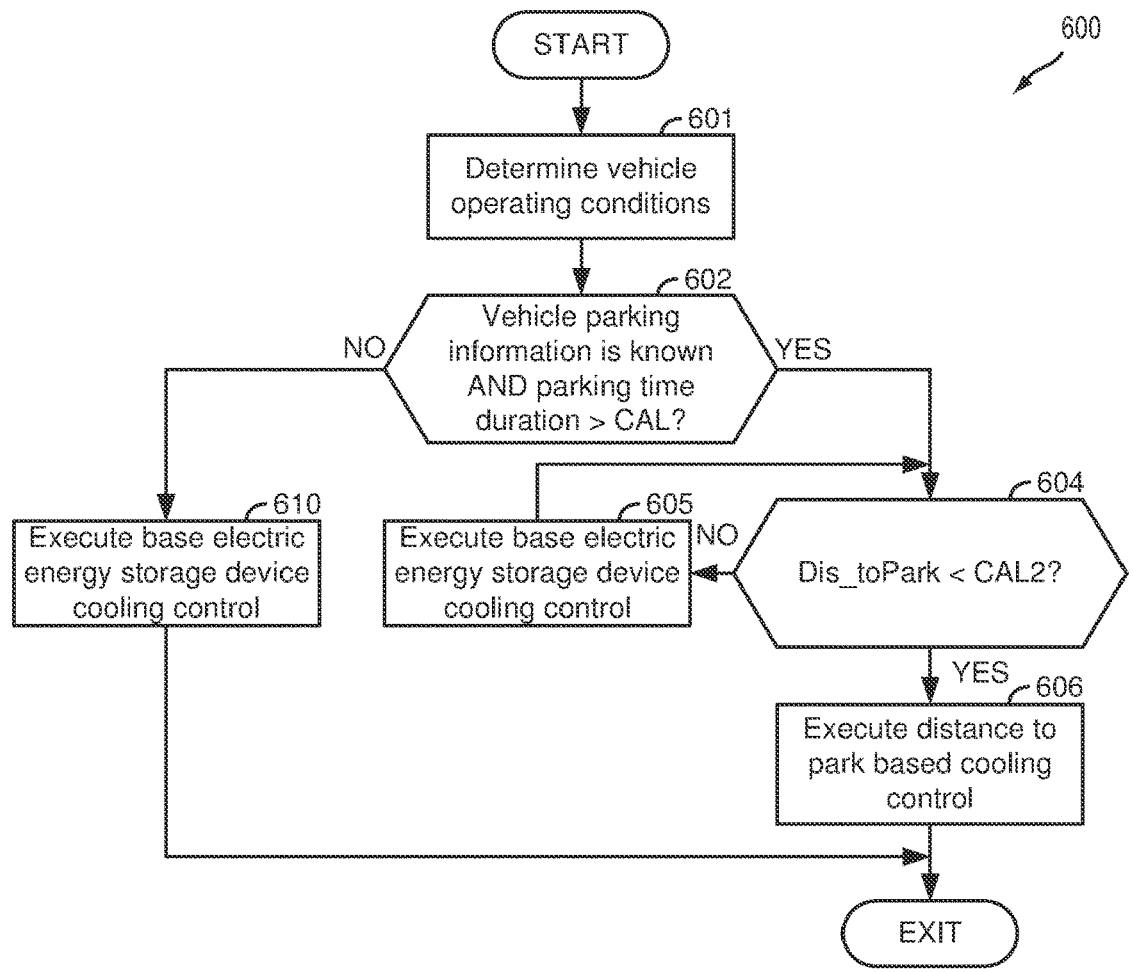
FIGS. 6-8 show example flowcharts for temperature control of an electric energy storage device.
Figure 7:
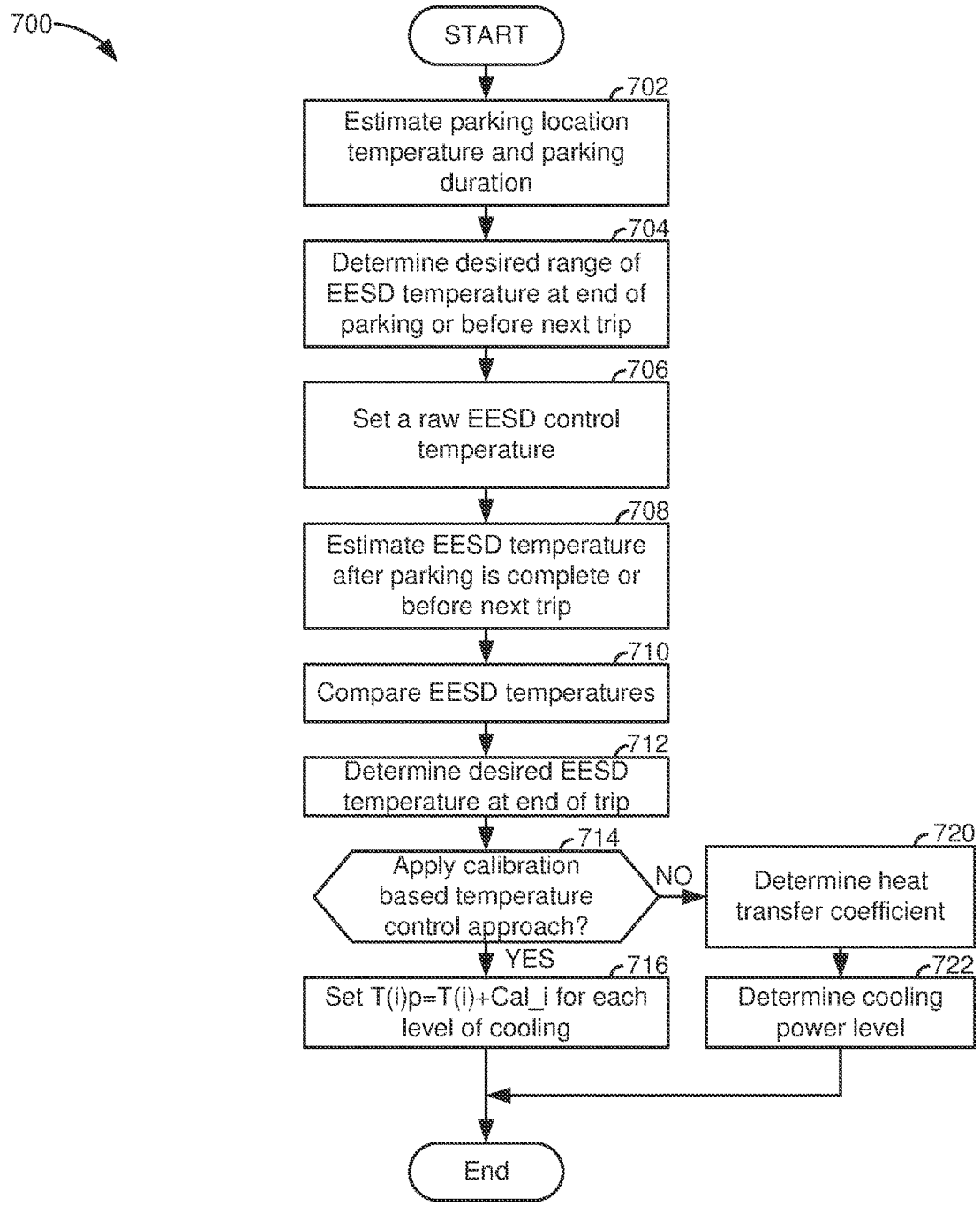
Figure 8:
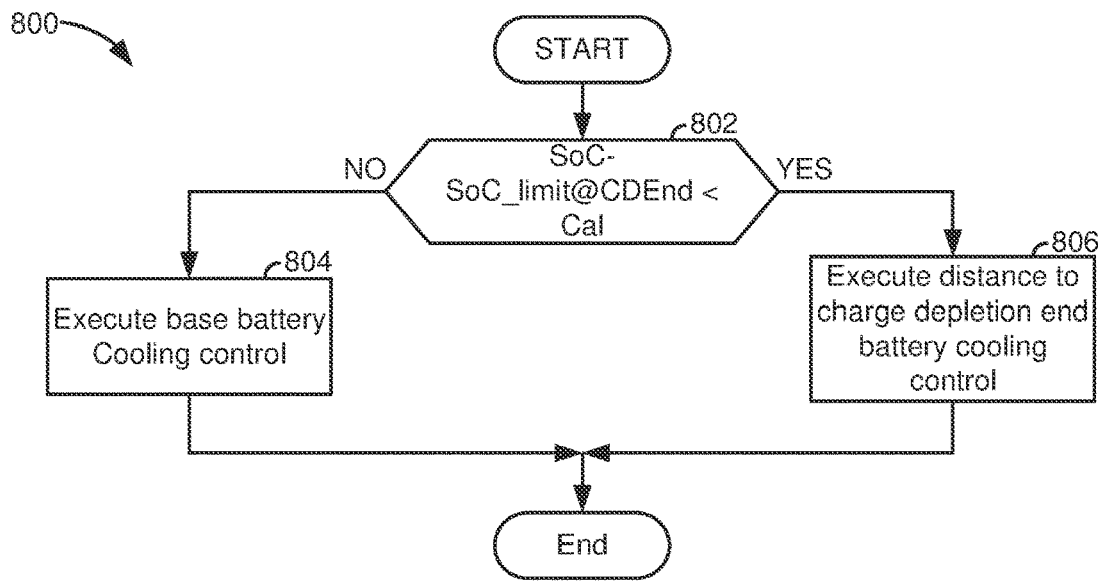

The following description relates to systems and methods for managing temperature of an electric energy storage device of a vehicle. The systems and method may include more than one approach to regulate a temperature of the electric energy storage device. FIGS. 1 and 2 show example vehicle systems in which temperature of an electric energy storage device may be controlled so that the electric energy storage device may output a desired level of electric power. FIGS. 3 and 4 show temperature profiles of an electric energy storage device. FIG. 5 is a plot that illustrates how heat transfer coefficients may be adjusted to maintain a temperature of an electric energy storage device and limit use of electric energy storage device cooling. FIGS. 6-8 show flowcharts for managing operation of an electric energy storage device.

FIG. 1 illustrates an example electric vehicle propulsion system 100 for vehicle 121. Vehicle propulsion system 100 includes a front axle 133 and a rear axle 122. In some examples, rear axle may comprise two half shafts, for example first half shaft 122a, and second half shaft 122b. Vehicle propulsion system 100 further includes front wheels 130 and rear wheels 131a and 131b, as well as electric machine 120. Additionally, inverter 134 may be included in the propulsion system. In this example, front wheels 130 and/or rear wheels 131a and 131b may be driven via electrical propulsion sources (e.g., 120). The rear axle 122 is coupled to electric machine 120, which may be referred to as a traction motor. Electric machine 120 is the sole propulsion torque source for vehicle 121. Electric machine 120 is shown coupled to differential 136, and differential 136 is part of axle 122.

Electric machine 120 may receive electrical power from onboard electrical energy storage device 132. Furthermore, electric machine 120 may provide a generator function to convert the vehicle's kinetic energy into electrical energy, where the electrical energy may be stored at electric energy storage device 132 for later use by the electric machine 120. A temperature of electric energy storage device 132 may be determined from output of temperature sensor 110. An inverter 134 may convert alternating current generated by electric machine 120 to direct current for storage at the electric energy storage device 132 and vice versa. Electric energy storage device 132 may be a battery, capacitor, inductor, or other electric energy storage device.

In some examples, electric energy storage device 132 may be configured to store electrical energy that may be supplied to other electrical loads residing on-board the vehicle (other than the motor), including cabin heating and air conditioning, engine starting, headlights, cabin audio and video systems, etc. In this example configuration, vehicle 121 includes a cooling device 160 for an electric energy storage device. Cooling device 160 may extract thermal energy from electric energy storage device 132 via vapor compression, for example. In one example, cooling device 160 may be a heat pump. In other examples, cooling device 160 may be a liquid to air heat exchanger, air to air heat exchanger, or other known type of cooling device. Cooling device 160 may be controlled via control system 14 or via a local controller. Cooling device 160 may include a first heat exchanger 163 to extract thermal energy from electric energy storage device 132 and a second heat exchanger 162 to reject heat to ambient air. Cooling device 160 may also include a compressor or pump 161 for compressing a refrigerant or liquid that circulates within cooling device 160. Cooling device 160 may include a fan 164. A cooling power of cooling device 160 may be adjusted via adjusting speeds of pump 161 and fan 164, both of which may be referred to as cooling devices that are a part of cooling device 160.

Control system 14 may communicate with one or more of cooling device 160, electric energy storage device 132, electric machine 120, clutches 193 and 191, brake controller 141, inverter 134, etc. Control system 14 may receive sensory feedback information from one or more of heat pump 160, electric energy storage device 132, electric machine 120, brake controller 141, inverter 134, etc. Further, control system 14 may send control signals to one or more of heat pump 160, electric energy storage device 132, engine 110, clutches 191 and 193, brake controller 141, inverter 134, electric machine 120, etc., responsive to this sensory feedback. Control system 14 may receive an indication of an operator requested output of the vehicle propulsion system from a human operator 102, or an autonomous controller. For example, control system 14 may receive sensory feedback from pedal position sensor 194 which communicates with pedal 192. Pedal 192 may refer schematically to a driver demand pedal. Similarly, control system 14 may receive an indication of an operator requested vehicle braking via a human operator 102, or an autonomous controller. For example, control system 14 may receive sensory feedback from pedal position sensor 157 which communicates with brake pedal 156.

One or more wheel speed sensors (WSS) 195 may be coupled to one or more wheels of vehicle propulsion system 100. The wheel speed sensors may detect rotational speed of each wheel. Such an example of a WSS may include a permanent magnet type of sensor.

Vehicle propulsion system 100 may further include a brake system control module (BSCM) 141. In some examples, BSCM 141 may comprise an anti-lock braking system, such that wheels (e.g. 130, 131*a*, 131*b*) may maintain tractive contact with the road surface according to driver inputs while braking, which may thus prevent the wheels from locking up, to prevent skidding. In some examples, BSCM may receive input from wheel speed sensors 195. Further brake system control module 141 may communicate with controller 12 via CAN 299. BSCM may apply right friction brakes 196*a* and left friction brakes 196*b* to apply torque to rotors (not shown) that are coupled to half shafts 122*a* and 122*b* to slow wheels 131*a* and 131*b*.

Controller 12 may comprise a portion of a control system 14. In some examples, controller 12 may be a single controller of the vehicle. Control system 14 is shown receiving information from a plurality of sensors 16 (various examples of which are described herein) and sending control signals to a plurality of actuators 81 (various examples of which are described herein). As one example, sensors 16 may include, wheel speed sensor(s) 195, vehicle yaw rate sensors, vehicle longitudinal acceleration sensors, vehicle lateral acceleration sensors, steering wheel position sensors, an accelerator pedal position sensor, a brake pedal position sensor, clutch fluid pressure sensors for clutches 191 and 193, etc. In some examples, sensors associated with inverter 134, electric machine 120, clutches 191 and 193, etc., may communicate information to controller 12.

Dashboard 19 may include a human machine interface (HMI) 18 configured to display information to the vehicle operator. HMI 18 may comprise, as a non-limiting example, a touchscreen or display which enables the vehicle operator to view graphical information as well as input commands. In some examples, HMI 18 may be connected wirelessly to the internet (not shown) via controller (e.g. 12). As such, in some examples, the vehicle operator may communicate via display system 18 with an internet site or software application (app).

Dashboard 19 may also include a navigation system 13 that may determine a position of vehicle 121 according to data provided via a satellite network 114 and/or a cellular phone network 116. Navigation system 13 may also receive input from vehicle occupants. Navigation system 13 may determine a travel route between the vehicle's origin or the vehicle's present position and a destination. Navigation system 13 may also determine a distance from the vehicle's present position to the destination. Navigation system 13 may alone or in combination with control system 14 and/or HMI 18 determine driving patterns. The driving patterns may include routes and parking times for home, stores, offices, filling stations, etc. that are frequent destinations for the vehicle. For example, navigation system 13 and/or control system 14 may determine that the vehicle travels from a home location to a work location Monday through Friday at 7:00 AM local time. Further, navigation system 13 and/or control system 14 may determine that the vehicle travels from work to home Monday through Friday at 5:00 PM local time. Navigation system 13 and/or control system 14 may also determine that the vehicle is parked at home Monday through Friday for an average of thirteen hours. Navigation system 113 and/or control system 14 may also predict an amount of time that the vehicle will be park based on the vehicle's parking location and prior navigation system history including amounts of time that the vehicle was parked at a particular location. For example, the navigation system 113 and/or control system 14 may predict that the vehicle will be parked for 13 hours based on a history of the vehicle being parked on average for 13 hours Monday through Friday at a home location.

Navigation system 13 may also receive weather forecasts for times and days in the future so that navigation system and/or controller 12 may determine a future temperature at the vehicle's destination or parking location. For example, navigation system 13 may request a weather forecast data from a remote server via satellite 114 or cellular network 116. The weather data may then be used as the ambient environmental temperature at the time the vehicle parks and at the time that the vehicle is expected to exit park.

Dashboard 19 may further include an operator interface 15 via which the vehicle operator may adjust the operating status of the vehicle. Specifically, the operator interface 15 may be configured to initiate and/or terminate operation of the vehicle driveline (e.g., inverter 134 and electric machine 120) based on an operator input. Various examples of the operator ignition interface 15 may include interfaces that require a physical apparatus, such as an active key, that may be inserted into the operator ignition interface 15 to start the engine 110 and turn on the vehicle, or may be removed to shut down the engine 110 and turn off the vehicle.

Electric energy storage device 132 includes an electric energy storage device controller 139 and a power distribution module 138. Electric energy storage device controller 139 may provide charge balancing between energy storage element (e.g., battery cells) and communication with other vehicle controllers (e.g., controller 12). Power distribution module 138 controls flow of power into and out of electric energy storage device 132. Electric energy storage device 132 may receive electric power via a charger 137. Charger 137 may receive electric power via stationary power grid 143 by way of plug 143a and receptacle 144.

The system of FIG. 1 shows controller 12 and braking controller 141, but the methods and systems described herein are not limited to one configuration. Rather, the system may include a single controller or it may distribute control via additional controllers. For example, the system may include a separate controllers configured in hardware and in the form of a vehicle controller, inverter 134, an electric machine controller, a braking system controller, and a vehicle stability controller. Alternatively, the system may include a single controller configured in hardware for performing the method described herein. Thus, the system described herein should not be construed as limiting.

FIG. 2 is a block diagram of an alternative vehicle 225 including a powertrain or driveline 200. The powertrain of FIG. 2 includes engine 10 shown in FIG. 1. Powertrain 200 is shown including vehicle system controller 255, engine controller 212, electric machine controller 252, transmission controller 254, energy storage device controller 253, and brake controller 250. The controllers may communicate over controller area network (CAN) 299. Each of the controllers may provide information to other controllers such as power output limits (e.g., power output of the device or component being controlled not to be exceeded), power input limits (e.g., power input of the device or component being controlled not to be exceeded), power output of the device being controlled, sensor and actuator data, diagnostic information (e.g., information regarding a degraded transmission, information regarding a degraded engine, information regarding a degraded electric machine, information regarding degraded brakes). Further, the vehicle system controller 255 may provide commands to engine controller 13, electric machine controller 252, transmission controller 254, and brake controller 250 to achieve driver input requests and other requests that are based on vehicle operating conditions.

For example, in response to a driver releasing a driver demand pedal and vehicle speed, vehicle system controller 255 may request a desired wheel power or a wheel power level to provide a desired rate of vehicle speed reduction. The requested desired wheel power may be provided by vehicle system controller 255 requesting a first braking power from electric machine controller 252 and a second braking power from engine controller 212, the first and second powers providing a desired driveline braking power at vehicle wheels 216. Vehicle system controller 255 may also request a friction braking power via brake controller 250. The braking powers may be referred to as negative powers since they slow driveline and wheel rotation. Positive power may maintain or increase speed of the driveline and wheel rotation.

In other examples, the partitioning of controlling powertrain devices may be partitioned differently than is shown in FIG. 2. For example, a single controller may take the place of vehicle system controller 255, engine controller 212, first electric machine controller 252, second electric machine controller 257, transmission controller 254, and brake controller 250. Alternatively, the vehicle system controller 255 and the engine controller 212 may be a single unit while the electric machine controller 252, the transmission controller 254, and the brake controller 250 are standalone controllers.

In this example, powertrain 200 may be powered by engine 10 and electric machine 240. In other examples, engine 10 may be omitted. Engine 10 may be started via driveline integrated starter/generator (ISG) 240 also known as an integrated starter/generator. Driveline ISG 240 (e.g., high voltage (operated with greater than 30 volts) electrical machine) may also be referred to as an electric machine, motor, and/or generator. Further, power of engine 10 may be adjusted via power actuator 204, such as a fuel injector, throttle, etc.

Driveline 200 is shown to include an electric energy storage device 262 that may output a higher voltage (e.g., greater than 48 volts) than electric energy storage device 263 (e.g., 12 volts). DC/DC converter 245 may allow exchange of electrical energy between high voltage bus 291 and low voltage bus 292. High voltage bus 291 is electrically coupled to inverter 247 and higher voltage electric energy storage device 262. Low voltage bus 292 is electrically coupled to lower voltage electric energy storage device 263 and sensors/actuators/accessories 279. Electrical accessories 279 may include but are not limited to front and rear windshield resistive heaters, vacuum pumps, climate control fans, and lights. Inverter 247 converts DC power to AC power and vice-versa to enable power to be transferred between ISG 240 and electric energy storage device 262. Electric energy storage device 262 may be charged via a stationary electric grid (not shown) such that vehicle 225 may be a plug-in hybrid vehicle.

Electric energy storage deice 262 may be cooled via a cooling device 160, which may be of the same type shown in FIG. 1. Cooling device 160 may extract thermal energy from electric energy storage device 262 via vapor compression, for example. In one example, cooling device 160 may be a heat pump. In other examples, cooling device 160 may be a liquid to air heat exchanger, air to air heat exchanger, or other known type of cooling device. Cooling device 160 may be controlled via controller 212. Cooling device 160 may include a first heat exchanger 163 to extract thermal energy from electric energy storage device 132 and a second heat exchanger 162 to reject heat to ambient air. Cooling device 160 may also include a compressor 161 for compressing a refrigerant or liquid that circulates within cooling device 160.

An engine output power may be transmitted to an input or first side of powertrain disconnect clutch 235 through dual mass flywheel 215. Disconnect clutch 236 may be electrically or hydraulically actuated. The downstream or second side 234 of disconnect clutch 236 is shown mechanically coupled to ISG input shaft 237.

ISG 240 may be operated to provide power to powertrain 200 or to convert powertrain power into electrical energy to be stored in electric energy storage device 262 in a regeneration mode. ISG 240 is in electrical communication with energy storage device 262. ISG 240 directly drives powertrain 200 or may be directly driven by powertrain 200. There are no belts, gears, or chains to couple ISG 240 to powertrain 200. Rather, ISG 240 rotates at the same rate as powertrain 200. Electrical energy storage device 262 (e.g., high voltage battery or power source) may be a battery, capacitor, or inductor. The downstream side of ISG 240 is mechanically coupled to the impeller 285 of torque converter 206 via shaft 241. The upstream side of the ISG 240 is mechanically coupled to the disconnect clutch 236. ISG 240 may provide a positive power or a negative power to powertrain 200 via operating as a motor or generator as instructed by electric machine controller 252.

Torque converter 206 includes a turbine 286 to output power to input shaft 270. Input shaft 270 mechanically couples torque converter 206 to automatic transmission 208. Torque converter 206 also includes a torque converter bypass lock-up clutch 212 (TCC). Power is directly transferred from impeller 285 to turbine 286 when TCC is locked. TCC is electrically operated by controller 254. Alternatively, TCC may be hydraulically locked. In one example, the torque converter may be referred to as a component of the transmission.

When torque converter lock-up clutch 212 is fully disengaged, torque converter 206 transmits engine power to automatic transmission 208 via fluid transfer between the torque converter turbine 286 and torque converter impeller 285, thereby enabling torque multiplication. In contrast, when torque converter lock-up clutch 212 is fully engaged, the engine output power is directly transferred via the torque converter clutch to an input shaft 270 of transmission 208. Alternatively, the torque converter lock-up clutch 212 may be partially engaged, thereby enabling the amount of power directly transferred to the transmission to be adjusted. The transmission controller 254 may be configured to adjust the amount of power transmitted by torque converter 212 by adjusting the torque converter lock-up clutch in response to various engine operating conditions, or based on a driver-based engine operation request.

Torque converter 206 also includes pump 283 that pressurizes fluid to operate disconnect clutch 236, forward clutch 210, and gear clutches 211. Pump 283 is driven via impeller 285, which rotates at a same speed as ISG 240.

Automatic transmission 208 includes gear clutches (e.g., gears 1-10) 211 and forward clutch 210. Automatic transmission 208 is a fixed ratio transmission. Alternatively, transmission 208 may be a continuously variable transmission that has a capability of simulating a fixed gear ratio transmission and fixed gear ratios. The gear clutches 211 and the forward clutch 210 may be selectively engaged to change a ratio of an actual total number of turns of input shaft 270 to an actual total number of turns of wheels 216. Gear clutches 211 may be engaged or disengaged via adjusting fluid supplied to the clutches via shift control solenoid valves 209. Power output from the automatic transmission 208 may also be relayed to wheels 216 to propel the vehicle via output shaft 260. Specifically, automatic transmission 208 may transfer an input driving power at the input shaft 270 responsive to a vehicle traveling condition before transmitting an output driving power to the wheels 216. Transmission controller 254 selectively activates or engages TCC 212, gear clutches 211, and forward clutch 210. Transmission controller also selectively deactivates or disengages TCC 212, gear clutches 211, and forward clutch 210.

A frictional force may be applied to wheels 216 by engaging friction wheel brakes 218. In one example, friction wheel brakes 218 may be engaged in response to a human driver pressing their foot on a brake pedal (not shown) and/or in response to instructions within brake controller 250. Further, brake controller 250 may apply brakes 218 in response to information and/or requests made by vehicle system controller 255. In the same way, a frictional force may be reduced to wheels 216 by disengaging wheel brakes 218 in response to the human driver releasing their foot from a brake pedal, brake controller instructions, and/or vehicle system controller instructions and/or information. For example, vehicle brakes may apply a frictional force to wheels 216 via controller 250 as part of an automated engine stopping procedure. A braking torque may be determined as a function of brake pedal position.

In response to a request to increase a speed of vehicle 225, vehicle system controller may obtain a driver demand power or power request from a driver demand pedal or other device. Vehicle system controller 255 then allocates a fraction of the requested driver demand power to the engine and the remaining fraction to the ISG or BISG. Vehicle system controller 255 requests the engine power from engine controller 212 and the ISG power from electric machine controller 252. If the ISG power plus the engine power is less than a transmission input power limit (e.g., a threshold value not to be exceeded), the power is delivered to torque converter 206 which then relays at least a fraction of the requested power to transmission input shaft 270. Transmission controller 254 selectively locks torque converter clutch 212 and engages gears via gear clutches 211 in response to shift schedules and TCC lockup schedules that may be based on input shaft power and vehicle speed. In some conditions when it may be desired to charge electric energy storage device 262, a charging power (e.g., a negative ISG power) may be requested while a non-zero driver demand power is present. Vehicle system controller 255 may request increased engine power to overcome the charging power to meet the driver demand power.

In response to a request to reduce a speed of vehicle 225 and provide regenerative braking, vehicle system controller may provide a negative desired wheel power (e.g., desired or requested powertrain wheel power) based on vehicle speed and brake pedal position. Vehicle system controller 255 then allocates a fraction of the negative desired wheel power to the ISG 240 and the engine 10. Vehicle system controller may also allocate a portion of the requested braking power to friction brakes 218 (e.g., desired friction brake wheel power). Further, vehicle system controller may notify transmission controller 254 that the vehicle is in regenerative braking mode so that transmission controller 254 shifts gears 211 based on a unique shifting schedule to increase regeneration efficiency. Engine 10 and ISG 240 may supply a negative power to transmission input shaft 270, but negative power provided by ISG 240 and engine 10 may be limited by transmission controller 254 which outputs a transmission input shaft negative power limit (e.g., not to be exceeded threshold value). Further, negative power of ISG 240 may be limited (e.g., constrained to less than a threshold negative threshold power) based on operating conditions of electric energy storage device 262, by vehicle system controller 255, or electric machine controller 252. Any portion of desired negative wheel power that may not be provided by ISG 240 because of transmission or ISG limits may be allocated to engine 10 and/or friction brakes 218 so that the desired wheel power is provided by a combination of negative power (e.g., power absorbed) via friction brakes 218, engine 10, and ISG 240.

Accordingly, power control of the various powertrain components may be supervised by vehicle system controller 255 with local power control for the engine 10, transmission 208, electric machine 240, and brakes 218 provided via engine controller 13, electric machine controller 252, transmission controller 254, and brake controller 250.

As one example, an engine power output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 212 may control the engine power output by controlling a combination of fuel pulse width, fuel pulse timing, and air charge. Engine braking power or negative engine power may be provided by rotating the engine with the engine generating power that is insufficient to rotate the engine. Thus, the engine may generate a braking power via operating at a low power while combusting fuel, with one or more cylinders deactivated (e.g., not combusting fuel), or with all cylinders deactivated and while rotating the engine. The amount of engine braking power may be adjusted via adjusting engine valve timing. Engine valve timing may be adjusted to increase or decrease engine compression work. Further, engine valve timing may be adjusted to increase or decrease engine expansion work. In all cases, engine control may be performed on a cylinder-by-cylinder cylinder basis to control the engine power output.

Electric machine controller 252 may control power output and electrical energy production from ISG 240 by adjusting current flowing to and from field and/or armature windings of ISG 240 as is known in the art.

Transmission controller 254 receives transmission input shaft position via position sensor 271. Transmission controller 254 may convert transmission input shaft position into input shaft speed via differentiating a signal from position sensor 271 or counting a number of known angular distance pulses over a predetermined time interval. Transmission controller 254 may receive transmission output shaft torque from torque sensor 272. Alternatively, sensor 272 may be a position sensor or torque and position sensors. If sensor 272 is a position sensor, controller 254 may count shaft position pulses over a predetermined time interval to determine transmission output shaft velocity. Transmission controller 254 may also differentiate transmission output shaft velocity to determine transmission output shaft rate of speed change. Transmission controller 254, engine controller 13, and vehicle system controller 255, may also receive addition transmission information from sensors 277, which may include but are not limited to pump output line pressure sensors, transmission hydraulic pressure sensors (e.g., gear clutch fluid pressure sensors), ISG temperature sensors, gear shift lever sensors, and ambient temperature sensors. Transmission controller 254 may also receive requested gear input from gear shift selector 290 (e.g., a human/machine interface device). Gear shift selector 290 may include positions for gears 1–N (where N is an upper gear number), D (drive), and P (park).

Brake controller 250 receives wheel speed information via wheel speed sensor 221 and braking requests from vehicle system controller 255. Brake controller 250 may also receive brake pedal position information from brake pedal sensor 154 shown in FIG. 1 directly or over CAN 299. Brake controller 250 may provide braking responsive to a wheel power command from vehicle system controller 255. Brake controller 250 may also provide anti-lock and vehicle stability braking to improve vehicle braking and stability. As such, brake controller 250 may provide a wheel power limit (e.g., a threshold negative wheel power not to be exceeded) to the vehicle system controller 255 so that negative ISG power does not cause the wheel power limit to be exceeded. For example, if controller 250 issues a negative wheel power limit of 50 N-m, ISG power is adjusted to provide less than 50 N-m (e.g., 49 N-m) of negative power at the wheels, including accounting for transmission gearing.

The systems of FIGS. 1 and 2 provide for a vehicle system, comprising: an electric energy storage device; a cooling device configured to extract thermal energy from the electric energy storage device; and a controller including executable instructions stored in non-transitory memory to adjust an amount of heat extracted from the electric energy storage device via the cooling device in response to a desired electric energy storage device temperature at an end of a vehicle trip. The vehicle system further comprises adjusting a cooling level of the cooling device based on a plurality of thresholds, where the plurality of thresholds are determined via offset values, where the offset values are based on a present battery temperature or a battery temperature at the end of the vehicle trip. The vehicle system includes where the desired electric energy storage device temperature at the end of the vehicle trip is based on estimating what a temperature of the electric energy storage device will be at an end of a parking period of the vehicle, upper and lower bound temperatures of the electric energy storage device at the end of the parking period of the vehicle, and ambient environment temperature during vehicle parking. The vehicle system includes where the adjusting the amount of heat extracted from the electric energy storage device includes adjusting cooling of the electric energy storage device based on a predicted battery power use during a predicted time to park, and where the desired electric energy storage device temperature is based on an amount of charge received by the electric energy storage device while a vehicle is in park. The vehicle system includes where the desired electric energy storage device temperature at an end of a vehicle trip is based on a temperature above which the electric energy storage device output power is reduced to less than a full power capability of the electric energy storage device. The vehicle system further comprises additional instructions to adjust the amount of heat extracted from the electric energy storage device via the cooling device in response to an ambient environmental temperature.

Referring now to FIG. 3, a plot of electric energy storage device temperature versus vehicle parking time duration is shown. The vertical axis represents a temperature of an electric energy storage device and the temperature increases in the direction of the vertical axis arrow. The horizontal axis represents an amount of time that a vehicle is parked and its propulsive power sources are powered down (e.g., shut off). The amount of time increases in the direction of the horizontal axis arrow. The vehicle with an electric energy storage device begins a parking duration and is parked at the time where the vertical axis intersects with the horizontal axis. Thus, the amount of time that the vehicle is parked when the vehicle is parked at the time shown at the vertical axis is zero seconds.

Horizontal line 302 represents a temperature above which power output of the electric energy storage may be cut-off or significantly reduced for battery thermal protection of the battery. Trace 304 represents a temperature of an electric energy storage device of a vehicle that is parked when ambient environmental air temperature (e.g., temperature of air that is surrounding the vehicle that includes the electric energy storage device) is a first temperature. Trace 306 represents the temperature of the same electric energy storage device of the same vehicle when the same vehicle is parked and ambient environmental air temperature is a second temperature, the second temperature is lower than the first temperature.

It may be observed that the temperatures of the electric energy storage device are equal when the vehicle is parked at the first ambient environmental temperature and when the vehicle is parked at the second ambient environmental temperature. However, the temperature of the electric energy storage device is reduced at a faster rate when the ambient environmental temperature is lower as compared to when the ambient environmental temperature is higher. In addition, as the amount of time that the vehicle is parked increases, the closer the temperatures of the electric energy source will be to ambient environmental temperature. The inventors have recognized that ambient environmental air temperature and vehicle parking duration may be useful parameters for determining cooling of an electric energy storage device when a vehicle is being driven.

Referring now to FIG. 4, a prophetic plot of electric energy storage device temperature versus time is shown. The plot shows how the methods of FIGS. 6-8 may reduce energy consumption used to cool an electric energy storage device of a vehicle. The thermal management strategy described herein may reduce an amount of charge that is stored in an electric energy storage device and that is used to cool the electric energy storage device so that more charge may be available to propel the vehicle.

The vertical axis represents a temperature of an electric energy storage device and the temperature of the electric energy storage device increases in the direction of the vertical axis arrow. The horizontal axis represents time and time increases from the left side of the figure to the right side of the figure. Horizontal line 402 represents a temperature above which power output of the electric energy storage may be cut-off for battery thermal protection. Solid trace 406 represents a temperature of an electric energy storage device when the temperature of the electric energy device is controlled conventionally. Dashed trace 404 represents a temperature of an electric energy storage device when the temperature of the electric energy device is controlled via the methods of FIGS. 6-8. The ambient environmental temperature is the same for traces 404 and 406. Trace 404 is equal to trace 406 when only trace 406 is visible.

Between time t0 and time t1, vehicles (not shown) are being driven and the temperature of the electric energy storage devices is controlled via a baseline temperature control strategy. In one example, the baseline temperature control strategy may adjust a cooling fan speed in response to temperature of the electric energy storage device and an amount of electric power that is being sourced or sunk via an electric energy storage device irrespective of time or distance of the vehicle to a time when the vehicle parks. Alternatively, coolant flow rates may be adjusted to regulate the temperatures of the electric energy storage devices.

Between time t1 and time t2, the temperature of the electric energy storage device when the electric energy storage device temperature is conventionally controlled increases at a slow rate as compared to if temperature of the electric energy storage device is controlled according to the method of FIG. 6-8. Controlling the temperature in this way allows less power from the electric energy storage device to be used to control the temperature of the electric energy storage device when the temperature of the electric energy storage device is controlled according to the methods of FIGS. 6-8 as compared to when the temperature of the electric energy storage device is controlled according to the baseline method.

The temperature of the electric energy storage device may be permitted to approach threshold 402, but not exceed threshold 402, when temperature of the electric energy storage device is controlled according to a distance between the vehicle's present location and the location where the vehicle is expected to be parked according to the method of FIG. 7. In this example, the vehicle is parked and shutdown (e.g., the electric machine that provides propulsive effort is deactivated) at time t2 and the electric energy storage device cools according to surrounding ambient environmental temperature and without the electric energy storage device cooling system (e.g., the cooling pump) after time t2. The time from time t2 to t3 is the vehicle parking duration. The temperature of the electric energy storage device at the next time just before (e.g., one second before) the vehicle may be activated may be expected to be less than a temperature upper bound for a next vehicle trip 450 and greater than a temperature lower bound for a next vehicle trip 452. A vehicle trip may begin at a time when electric power is supplied to an electric propulsion device and the vehicle begins to move and the vehicle trip may end at a time when electric power is removed from the electric propulsion device and the vehicle is not moving. The vehicle may be activated when electric power is supplied to an electric propulsion device of the vehicle.

Referring now to FIG. 5, a plot of heat transfer coefficients versus battery temperature is shown. The plot represents how the controls may increase a battery cooling control level along as the battery temperature increases. The discrete cooling control levels may be selected based on calibratable battery temperature thresholds. The vertical axis represents values of heat transfer coefficients and the magnitude of the heat transfer coefficients increases in the direction of the vertical axis arrow. The horizontal axis represents temperature of the electric energy storage device and the temperature increases in the direction of the horizontal arrow.

The heat transfer coefficient represents cooling capability of each cooling control level due to activation of different cooling actuators or valves. For example, at level 1, $H\_0$ (0), it may be associated with natural heat transfer only with no active coolant circulation. At level 2 and 3, the coolant pump may be on, and depending on if the vehicle is equipped with a radiator, the cooling fan's speed for the radiator may be adjusted based on battery temperature. At level 4, a chiller can be activated to maximize cooling capacity. The baseline temperature control strategy for the electric energy storage device is applied to control a temperature of the electric energy storage device via a cooling device or other thermal management device. The baseline temperature control strategy applies the battery cooling control levels that are indicated by solid line 502. The methods of FIGS. 6-8 may apply the battery cooling control levels that are indicated by dashed line 504, and this may be referred to as method one calibration change only design. It may be observed that the cooling control levels for the methods of FIGS. 6-8 remain at lower values for higher electric energy storage device temperatures. For example, heat transfer coefficient $H_0(0)$, representing natural convection (no active cooling control) is applied by the baseline temperature control strategy for electric energy storage device temperatures between temperature T0 and temperature T1. Conversely, heat transfer coefficient $H_0(0)$ is applied by the temperature control methods of FIGS. 6-8 for an electric energy storage device temperatures between temperature T0 and temperature T1p. Temperature T1p is greater than temperature T1. As a result, the amount of energy used to cool the electric energy storage device when the method of FIGS. 6-8 is the basis for controlling the temperature of the electric energy storage device may be reduced as compared to when the baseline temperature control strategy is used to cool the electric energy storage device. Since less energy may be applied to cool the electric energy storage device, the temperature of the electric energy storage device may increase faster as compared to if the baseline temperature control strategy is applied to cool the electric energy storage device. However, since the methods of FIGS. 6-8 may be applied when a vehicle is near its parking location, the temperature increase of the electric energy storage device may be insufficient for the electric energy storage device temperature to reach a temperature above which the electric energy storage device has power cut-off. Therefore, methods 6-8 may have very little effect on the operation of the electric energy storage device.

Referring now to FIG. 6, a flowchart of a method of cooling an electric energy storage device is shown. The method of FIG. 6 may work in cooperation with the method of FIG. 7 and the systems of FIGS. 1 and 2. Further, at least portions of the method of FIG. 6 may be incorporated as executable instructions stored in non-transitory memory while other portions of the method may be performed via a controller transforming operating states of devices and actuators in the physical world.

At 601, method 600 determines vehicle operating conditions. Method 600 may use the systems and sensors that are described herein to determine the vehicle operating conditions. The vehicle operating conditions may include but are not limited to an estimated parking time for the vehicle, a vehicle destination, an ambient environmental temperature, a distance from the vehicle's present location to a destination, electric energy storage device temperature, and operating conditions of a cooling pump or other thermal management device. Method 600 proceeds to 602.

At 602, method 600 judges if vehicle parking information (e.g., estimate of parking duration, vehicle parking location, temperature at the location of vehicle parking, etc.) is known by one of the vehicle's systems (e.g., navigation, control system, etc.) and if the parking time duration (e.g., an amount of time that the vehicle is parked with the vehicle's propulsion system deactivated) is greater than a calibratible value (e.g., a predetermined threshold value). If so, the answer is yes and method 600 proceeds to 604. Otherwise, the answer is no and method 600 proceeds to 610.

At 610, method 600 executes the base electric energy storage device cooling control. In one example, the base electric energy storage device cooling control as shown in FIG. 5, line 502. Method 600 proceeds to exit.

At 604, method 600 judges if the distance from the vehicle's present location to the vehicle's destination (e.g., the vehicle's parking location) is less than a calibratable value (e.g., a threshold distance). If so, the answer is yes and method 600 proceeds to 606. Otherwise, the answer is no and method 600 proceeds to 605.

At 605, method 600 executes the base electric energy storage device cooling control. In one example, the base electric energy storage device cooling control as shown in FIG. 5 line 502. Method 600 proceeds to exit.

At 606, method 600 executes a vehicle distance to parking location electric energy storage device cooling control (e.g., the method of FIG. 7). Method 600 proceeds to exit after exiting the vehicle distance to parking location electric energy storage device cooling control.

Referring now to FIG. 7, a flowchart of a method of cooling an electric energy storage device is shown. The method of FIG. 7 may work in cooperation with the method of FIG. 6 and the systems of FIGS. 1 and 2. Further, at least portions of the method of FIG. 7 may be incorporated as executable instructions stored in non-transitory memory while other portions of the method may be performed via a controller transforming operating states of devices and actuators in the physical world.

At 702, method 700 estimates a temperature at the parking location of the vehicle (e.g., the vehicle's destination). Method 700 may estimate the temperature at the vehicle's parking location based on the ambient environmental temperature at the vehicle's present location. Alternatively, method 700 may estimate the temperature at the parking location based on a weather forecast for the vehicle's destination. The weather forecast may be received from a cellular network 116 by the vehicle's navigation system 13 or via another controller of the vehicle.

Method 700 may also estimate a parking duration of the vehicle (e.g., an amount of time that the vehicle is parked and the propulsion system of the vehicle is shut-down (not supplied with electrical power)) for the next time the vehicle is parked. In one example, method 700 may estimate the vehicle parking duration for the next time the vehicle is parked based on a history of the vehicle parking at the vehicle's destination. For example, if the vehicle's destination is a home location and the vehicle on average is parked for eight hours at the home location, method 700 may estimate the parking duration of the vehicle as eight hours while the vehicle is being driven and before the vehicle is parked. The parking duration may begin when the vehicle's propulsion system is deactivated and the parking duration may end when the vehicle's propulsion system is activated. Method 700 proceeds to 704 after estimating the parking location temperature and the parking duration of the vehicle.

At 704, method 700 determines a desired range of temperature for the electric energy storage device (EESD) at the end of the vehicle parking period or before a next trip of the vehicle. In particular, method 700 determines an upper bound electric energy storage device temperature for when the parking period ends (Temp_NextTripUB) and a lower bound electric energy storage device temperature for when the parking period ends (Temp_NextTripLB). In one example, method 700 determines the values of variables Temp_NextTripUB and Temp_NextTripLB via ambient environmental temperature, desired battery operating temperature with some offsets (where the offsets can be ambient environmental temperature dependent), and expected power demand at the beginning portion of the next trip (for example, lower starting battery temperature is desired for higher power demand). Method 700 proceeds to 706.

At 706, method 700 determines and requests a raw EESD temperature. In one example, the raw electric energy storage device temperature may be determined via the following equation:

$$\text{Temp\_EndTrip\_D2PCtrlRaw} = \text{Temp\_pwrCutOff} - \text{cal3}$$

where Temp_EndTrip_D2PCtrlRaw is the requested raw EESD temperature, Temp_pwrCutOff is a predetermined temperature above which output power of the EESD is cut-off to power consumers, or reduced to less than a full power capability of the EESD, and cal3 is a calibration variable that represents a real number. The value of cal3 may be less than 5% of the value of Temp_pwrCutOff. Thus, the EESD temperature may be adjusted to a temperature that is near the temperature at which output power of the electric energy storage device is cut-off to power consumers for EESD thermal protection. Method 700 proceeds to 708.

At 708, method 700 estimates what the raw EESD temperature will be after the vehicle exits park. In one example, the raw EESD temperature when the vehicle exits park may be estimated via the following equation:

$$TempAftPkraw = Temp\_EndTrip\_D2PCtrlRaw - \frac{1}{\alpha}\int_0^{tpark} h(natural)(Tbat - Tamb)dt$$

where TempAftPkraw is the raw EESD temperature at the time that the vehicle exits park, Temp_EndTrip_D2PCtrlRaw is the requested raw EESD temperature, a is battery heat capacity, h (natural) is heat transfer coefficient between battery and ambient environment with no active cooling, Tbat is the present EESD temperature, and Tamb is ambient environmental temperature around the EESD, and tpark is the total parking time. Method 700 proceeds to 710.

At 710, method 700 compares the value of TempAftPkraw to Temp_NextTripUB and Temp_NextTripLB. If method 700 determines that Temp_NextTripLB<=TempAftPkraw<=Temp_NextTripUB, the raw electric energy storage device temperature after the vehicle exits park falls into a first case. If method 700 determines that TempAftPkraw>Temp_NextTripUB, the raw electric energy storage device temperature after the vehicle exits park falls into a second case. If method 700 determines that TempAftPkraw<Temp_NextTripLB, the raw electric energy storage device temperature after the vehicle exits park falls into a third case. Method 700 proceeds to 712.

At 712, method 700 determines the desired EESD temperature at the end of the trip (Temp_EndTrip_D2PCtrl) for distance to parking based control. Method 700 determines the desired EESD temperature at the end of the trip (Temp_EndTrip_D2PCtrl) according to the three cases mentioned at step 710. In particular, if method 700 determines that the first case is present at step 710, Temp_EndTrip_D2PCtrl=Temp_EndTrip_D2PCtrlRaw; if method 700 determines that the second case is present at step 710, Temp_AfterParkAdj=ratio*Temp_NextTripUB+(1−ratio)*Temp_NextTripLB, where ratio is a value between zero and 1 that may be dynamically adjusted, and $$Temp\_EndTrip\_D2PCtrl = Temp\_AfterParkAdj + \frac{1}{\alpha}\int_0^{tpark} h(natural)(Tbat - Tamb)dt;$$

and if method 700 determines that the third case is present at step 710, Temp_EndTrip_D2PCtrl=Temp_pwrCutOff−cal4, where cal4 is a real number that is close to zero (e.g., less than 3° C.). Method 700 proceeds to 714.

At 714, method 700 judges if a calibration based approach to EESD temperature control should be applied. In one example, method 700 may judge that a calibration based approach to EESD should be applied based on a value of a variable in controller memory. In another example, method 700 may judge that a calibration based approach to EESD should be applied based on operating conditions of the vehicle. For example, method 700 may judge that a calibration based approach to EESD should be applied in response to degradation of a vehicle system sensor or actuator. If method 700 judges that a calibration based approach to EESD should be applied, the answer is yes and method 700 proceeds to 716. Otherwise, the answer is no and method 700 proceeds to 720.

At 716, method 700 adjusts temperature thresholds to activate different cooling control levels for EESD according to temperature thresholds and offsets to the thresholds that are stored in controller memory. In particular, method 700 may also adjust cooling of an EESD according to values in a table or function. The values in the table or function may be similar to the values in the first table or function as shown at 502 of FIG. 5, but the values in the second table or function as shown at 504 of FIG. 5 may be a function of different EESD temperatures. For example, as indicated at temperatures T1p, T2p, and T3p in FIG. 5, where T1p>T1, T2p>T2, and T3p>T3, each of the temperatures in the table or function is raised with an offset value. The offset value permits delaying use of the next heat transfer coefficient to a higher EESD temperature. In particular, T(i)p=T(i)+Cal_i, where T(i) is T1, T2 and T3 as shown in FIG. 5. The offset Cal_i can be determined based on Cal_i=f(T(i)), where the EESD temperature is inversely proportional to the offset Cal_i. Alternatively, the value of the offset Cal_i may be a function of the present EESD temperature and a desired or requested EESD temperature at the beginning of the time that the vehicle is parked Cal_i=f($T_{bat}$, Temp_EndTrip_D2PCtrl).

The heat transfer coefficients represent cooling capability of each cooling control level due to activation of different cooling actuators or valves. For example, at level 1, H_0 (0), it may be associated with natural heat transfer only with no active coolant circulation. At level 2 and 3, the coolant pump may be on, and depending on if the vehicle is equipped with a radiator, the cooling fan's speed for the radiator may be adjusted based on battery temperature. At level 4, a chiller can be activated to maximize cooling capacity. The baseline temperature control strategy for the electric energy storage device is applied to control a temperature of the electric energy storage device via a cooling device or other thermal management device. The baseline temperature control strategy applies the battery cooling control levels that are indicated by solid line 502. The methods of FIGS. 6-8 may apply the battery cooling control levels that are indicated by dashed line 504. It may be observed that the cooling control levels for the methods of FIGS. 6-8 remain at lower values for higher electric energy storage device temperatures. Method 700 proceeds to exit.

At 720, method 700 determines a heat transfer coefficient. The heat transfer coefficient may allow the controller to adjust EESD temperature when the vehicle is within a threshold distance to the vehicle's next parking location such that EESD temperature will be at or near the desired EESD temperature at the end of the trip (Temp_EndTrip_D2PCtrl). To do this, method 700 back calculates from an EESD temperature at an end of a parking period to determine an desired EESD temperature at the end of the trip (Temp_EndTrip_D2PCtrl) so that the EESD temperature may be controlled when the vehicle is within a threshold distance of a parking destination such that EESD temperature will be at or near the desired EESD temperature at the end of the trip (Temp_EndTrip_D2PCtrl). Controlling the EESD temperature to the back calculated desired EESD temperature at the end of the trip allows the EESD to be closer to the desired EESD temperature after parking (Temp_AfterParking) while saving cooling energy during vehicle driving.

Method 700 may begin determining the heat transfer coefficient by determining a predicted amount of time from the present time to when the vehicle will be parked (tp). In one example, tp may be estimated by dividing the distance from the vehicle's present location to the vehicle's parking location (e.g., the vehicle's destination) by the vehicle's present speed. Within the duration of $t_p$, the average desired battery temperature change rate can be calculated as:

$$\frac{dT}{dt} = \frac{\text{Temp\_EndTrip\_D2PCtl} - T_{bat}}{t_p}$$

The predicted amount of time tp may be broken into one or more segments with a duration of tw where constant cooling power corresponding to expected average heat transfer coefficient ($H_{ave}$) may be applied to cool the EESD. In other words, the time $t_p$ may include several time segments with segment-wise constant cooling powers. The EESD working power for the next time window, $t_w$, (e.g. 3 min or longer) may be estimated from predicted vehicle propulsive power, vehicle operation mode and accessory usage. Predicted vehicle propulsive power can be obtained from driver past history, current route and vehicle operation, and V2X information. After the vehicle enters a distance to park control zone for reducing EESD energy to cool the EESD, the prediction of the rate of change of EESD temperature may be more certain as compared to if the vehicle being operated in traffic without regard to parking location and time.

For a specified time window $t_w$, EESD input and output current may be estimated from battery power usage, and from time t to time $t+t_w$, considering the EESD heat exchanger (e.g., cooling pump), the heat accumulation difference that cause battery temperature change may be determined by:

$$\alpha t_w \frac{dT}{dt} = \left\{ \int_t^{t+t_w} I(V_t - OCV(SOC))dt - \int_t^{t+t_w} H_{ave}(T_{bat} - T_{coolant})dt \right\}$$

where α is heat capacity of the battery, tw is the time window duration, SOC is EESD State of Charge, $V_t$ is EESD pack terminal voltage, OCV is EESD open circuit voltage, which is a function of SOC, $T_{bat}$ is EESD temperature, and $T_{coolant}$ is coolant temperature of EESD cooling system, I is battery charge (+)/discharge (−) current flow, and $H_{ave}$ is the average heat transfer coefficient. The first term at the right side of the equation is EESD heat generation, and second term is EESD heat dissipation.

The expected average heat transfer coefficient $H_{ave}$ during this time period may be derived as:

$$H_{ave} = \frac{\int_t^{t+t_w} I(V_t - OCV(SOC))dt - \alpha t_w \frac{dT}{dt}}{\int_t^{t+t_w} (T_{bat} - T_{coolant})dt}$$

where the variables are as previously described. Method 700 proceeds to 722.

At 722, method 700 determines a cooling power level. In one example, $H_{ave}$ may be compared to values in a table or function H(p) in FIG. 5 and values in the table or function may be a basis for selecting the cooling power. For example, the cooling power can be chosen based on if $H_1(p_1) < H_{ave} \leq H_2(p_2)$, the selected cooling power will be p2. Note that when $H_{ave} < H_0(p_0)$, no active cooling is required. This may occur when the propulsive power demand at the end of the trip is low. In such case, Ctrl_Dis2Park control may be activated sooner in a drive cycle to reduce cooling effort for a longer period of time. In particular, when the method of FIG. 6 is executed the calibration threshold associated with "distance to park" can be adjusted based on the predicted power demand at the end of the trip.

Method 700 commands the battery cooling actuators that can provide the cooling system power. Method 700 proceeds to exit.

When a battery electric vehicle (BEV) (e.g., a vehicle that is propelled solely via an electric machine) or a plug-in hybrid electric vehicle (PHEV) is parked, the EESD may be charged. The temperature of the EESD may be affected by charging the EESD. EESD thermal conditions during EESD charging when the vehicle is parked may be considered for EESD distance to park control. However, stops and charging with DC fast charging systems may not qualify for EESD distance to park control because of short stopping time and bigger thermal impact.

During EESD charging, EESD temperature change may be monitored, and the EESD cooling system may be activated when desired to reduce a possibility of ESSD temperature from exceeding Temp_NextTripUB-offset. For example, when the ambient environment is hot, EESD cooling system may be activated to make the net heat effect of EESD charging and cooling (e.g., heat generated during EESD charging minus heat removed by cooling during EESD charging) to be closer to natural heat convection, which may be an assumption made for Ctrl_Dis2Park. EESD cooling capability under this use case can be different from vehicle under driving, and can be analyzed for PHEVs/BEVs with different cooling system configuration (radiator, chiller etc.). During conditions when ambient environment is cold and parking time is long, the heat generated from charging the EESD may be used within the EESD to hold EESD temperature above Temp_NextTripLB so that EESD cooling via the EESD cooling device becomes unnecessary.

For this approach, the raw EESD temperature when the vehicle exits park may be estimated via the following revised equation:

$$TempAftPkraw = \text{Temp\_EndTrip\_D2PCtrlRaw} - \frac{1}{\alpha} \int_0^{t_{park}} h(natural)(T_{bat} - T_{enviroment})dt + \frac{1}{\alpha} \int_0^{t_{chrg}} I_{chrg}(V_t - OCV(SOC))dt$$

The term $$\frac{1}{\alpha} \int_0^{t_{chrg}} I_{chrg}(V_t - OCV(SOC))dt$$

represents heat generated due to EESD charging. The charging current ($I_{chrg}$) may be obtained based on parking location (e.g., whether the location is equipped with level 1 or level 2 charging facility). The charging time ($t_{chrg}$) may be estimated based on the predicted SOC charging range, from SOC$_{chrgStart}$ (estimated SOC at the end of the trip) to SOC$_{chrgTarget}$ (SOC charging target), which can be learned from operator's historical driving pattern using an optimal target value (e.g., 80% SOC, or a full 100% SOC value). In addition, charging time (t$_{chrg}$) can be estimated based on customer's calendar or input, if available.

In another example, the added third term may be estimated as:

$$\frac{1}{\alpha}(1 - Eff_{battChrg})QV_{ave}(SOC_{chrgTarget} - SOC_{chrgStart})$$

where Eff$_{battChrg}$ is the average battery charging efficiency, Q is battery capacity, and V$_{ave}$ is the average battery voltage across the SOC charge range. Thus, step 706 may be enhanced in this way.

Referring now to FIG. 8, a flowchart of a method that may be applied to modify the method of FIGS. 6 and 7 is shown. This may be referred to as a second use case for FIGS. 6 and 7. The method of FIGS. 6 and 7 may be modified and adapted for the second use case, which is an end of charge depletion (CD) mode (e.g., the vehicle may be propelled solely via the electric machine) for plug-in hybrid electric vehicles (PHEVs). For this use case, the similarity with use case 1 is, after the vehicle enters charge sustain (CS) mode, the engine becomes the primary actuator for vehicle driving and the usage of battery is significantly reduced from CD mode. After charge depletion mode, the battery's usage may be significantly less. Therefore, the same distance to park cooling control idea may be adopted. The method of FIG. 8 may work in cooperation with the method of FIGS. 6 and 7 in the systems of FIGS. 1 and 2. Further, at least portions of the method of FIG. 8 may be incorporated as executable instructions stored in non-transitory memory while other portions of the method may be performed via a controller transforming operating states of devices and actuators in the physical world.

At 802, method 800 judges if the EESD present state of charge (SOC) minus a SOC limit of charge depletion mode (e.g., a SOC threshold below which the vehicle's engine is started to replenish the EESD SOC when the EESD is being depleted of charge, such as when the vehicle is being propelled via from power generated solely via an electric machine) is smaller than a threshold state of charge level (e.g., cal5). If so, the answer is yes and method 800 proceeds to 806. Otherwise, the answer is no and method 800 proceeds to 804.

At 804, method 800 adjusts a temperature of the EESD according to a base strategy. The base strategy may adjust a heat transfer coefficient according to a temperature of the EESD. In particular, method 800 applies the battery cooling control levels that are indicated by solid dashed line 502 of FIG. 5. For example, heat transfer coefficient H$_0$(0) is applied between temperature T0 and temperature T1. Method 800 proceeds to exit.

At 806, method 800 executes a distance to charge depletion end control (Ctrl_CD_End). In particular, method 800 determines an EESD temperature at an end of an EESD charge depletion period (Temp_EndCD) so that the EESD temperature may be controlled when battery SOC is within a threshold from SOC limit for the end of charge depletion mode such that EESD temperature will be at or near the temperature at the end of the EESD charge depletion period. The end of the charge depletion mode may be when an engine of the vehicle begins to supply power to charge the electric energy storage device and/or when the engine begins to supply power to propel the vehicle. The EESD charge depletion period may be a period that the vehicle is propelled solely on electric power that is provided by the EESD after the EESD has been charged via a power grid or stationary power source, or at the beginning of the trip and when there is sufficient battery SOC. The EESD charge depletion period may be followed by an EESD charge sustain period where EESD state of charge may be maintained within a range of level via charging the EESD during vehicle deceleration or via an engine, and where the EESD may be partially discharged to assist the engine.

Method 800 determines (e.g., estimates) the EESD temperature at the end of the EESD charge depletion period (Temp_EndCD). In one example, the EESD temperature at the end of the EESD charge depletion period is based on a function of EESD power (e.g., estimated average power) during an EESD charge sustain period. For example, Temp_EndCD may be a first value when EESD power during the EESD charge sustain period is a second value, and Temp_EndCD may be a third value when EESD power during the EESD charge sustain period is a fourth value, the first value less than the third value, and the second value greater than the fourth value.

Method 800 may judge if a calibration based approach to EESD temperature control should be applied. In one example, method 800 may judge that a calibration based approach to EESD should be applied based on a value of a variable in controller memory. In another example, method 800 may judge that a calibration based approach to EESD should be applied based on operating conditions of the vehicle. For example, method 800 may judge that a calibration based approach to EESD should be applied in response to degradation of a vehicle system sensor or actuator. If method 800 judges that a calibration based approach to EESD should be applied, method 800 applies the calibration approach. Otherwise, method 800 applies a second approach.

When applying the calibration approach, method 800 adjusts temperature thresholds to activate different cooling control levels for EESD according to temperature thresholds and offsets to the thresholds that are stored in controller memory.

Method 800 may also adjust cooling of an EESD according to values in a table or function. The values in the second table or function may be similar to the values in the first table or function, but the values in the second table or function may be a function of different EESD temperatures. For example, as indicated at temperatures T1p, T2p, and T3p in FIG. 5, where T1p>T1, T2p>T2, and T3p>T3, each of the temperatures in the table or function is raised with an offset value. The offset value permits delaying use of the next heat transfer coefficient to a higher EESD temperature. In particular, T(i)p=T(i)+Cal_i, where T(i) is T1, T2 and T3 as shown in FIG. 5. The offset Cal_i can be determined based on Cal_i=f(T(i)), where the EESD temperature is inversely proportional to the offset Cal_i. Alternatively, the value of the offset Cal_i may be a function of the present EESD temperature and a desired or requested EESD temperature at the beginning of the time that the vehicle is parked Cal_i=f(T$_{bat}$, Temp_EndCD). The heat transfer coefficients represent cooling capability of each cooling control level due to activation of different cooling actuators or valves as previously explained.

When applying the second approach, method 800 determines a heat transfer coefficient. Method 800 may begin determining the heat transfer coefficient by determining a predicted amount of time from the present time to when the vehicle will enter charge sustain mode (ts). In one example, ts may be estimated by current battery SOC, battery SOC at the end of charge depletion, battery voltage, and the estimated average battery power during the rest of the charge depletion operation. Within the duration of $t_s$, the average desired battery temperature change rate can be calculated as:

$$\frac{dT}{dt} = \frac{\text{Temp\_EndCD} - T_{bat}}{t_s}$$

The predicted amount of time ts may be broken into one or more segments with a duration of tw where constant cooling power corresponding to expected average heat transfer coefficient ($H_{ave}$) may be applied to cool the EESD. In other words, the time $t_s$ may include several time segments with segment-wise constant cooling powers. The EESD working power for the next time window, $t_w$, (e.g. 3 min or longer) may be estimated from predicted vehicle propulsive power, vehicle operation mode and accessory usage. Predicted vehicle propulsive power can be obtained from driver past history, current route and vehicle operation, and V2X information.

For a specified time window $t_w$, EESD input and output current may be estimated from battery power usage, and from time t to time t+$t_w$, considering the EESD heat exchanger (e.g., cooling pump), the heat accumulation difference that cause battery temperature change may be determined by:

$$\alpha t_w \frac{dT}{dt} = \left\{ \int_t^{t+t_w} I(V_t - OCV(SOC))dt - \int_t^{t+t_w} H_{ave}(T_{bat} - T_{coolant})dt \right\}$$

where α is heat capacity of the battery, tw is the time window duration, SOC is EESD State of Charge, $V_t$ is EESD pack terminal voltage, OCV is EESD open circuit voltage, which is a function of SOC, $T_{bat}$ is EESD temperature at time instant t, and $T_{coolant}$ is coolant temperature of EESD cooling system, I is battery charge (+)/discharge (−) current flow, and $H_{ave}$ is the average heat transfer coefficient. The first term at the right side of the equation is EESD heat generation, and second term is EESD heat dissipation.

The expected average heat transfer coefficient $H_{ave}$ during this time period may be derived as:

$$H_{ave} = \frac{\int_t^{t+t_w} I(V_t - OCV(SOC))dt - \alpha t_w \frac{dT}{dt}}{\int_t^{t+t_w} (T_{bat} - T_{coolant})dt}$$

where the variables are as previously described.

Method 800 also determines a cooling power level. In one example, $H_{ave}$ may be compared to values in a table or function H(p) in FIG. 5 and values in the table or function may be a basis for selecting the cooling power. For example, the cooling power can be chosen based on if $H_1(p_1) < H_{ave} \leq H_2(p_2)$, the selected cooling power will be p2. Method 800 commands the battery cooling actuators that can provide the cooling system power. Method 800 exits.

Thus, the methods of FIGS. 6-8 provide for a method for cooling an electric energy storage device, comprising: adjusting cooling of the electric energy storage device via a controller in response to an estimated distance between a vehicle and an expected parking location of the vehicle. The method includes where adjusting cooling of the electric energy storage device includes adjusting a cooling power of one or more cooling devices that cool the electric energy storage device, and where adjusting cooling of the electric energy storage device includes adjusting a cooling level based on a plurality of temperature thresholds, where the plurality of temperature thresholds are increased from base values. The method includes where adjusting cooling of the electric energy storage device includes decreasing a cooling power of one or more cooling devices. The method includes where the expected parking location is determined via a navigation system. The method includes where the adjusting is performed when an expected parking duration of a vehicle is greater than a threshold, and where the threshold varies as a function of ambient environmental temperature. The method includes where adjusting cooling of the electric energy storage device includes adjusting cooling of the electric energy storage device based on an expected temperature change rate of the electric energy storage device. The method includes where adjusting cooling of the electric energy storage device is based on predicted battery power usage during a predicted time to park duration. The method includes where the expected temperature change rate is based on a predicted time to park duration, and where the expected temperature change rate is based on a present electric energy storage device temperature. The method includes where the expected temperature change rate of the electric energy storage device is based on a desired electric energy storage device temperature at an end of a vehicle trip. The method includes where the desired electric energy storage device temperature at the end of the vehicle trip is based on estimating what a temperature of the electric energy storage device will be at an end of a parking period of the vehicle, an upper and lower bound temperature of the electric energy storage device at the end of the parking period of the vehicle, and the ambient environment temperature during vehicle parking.

The method of FIGS. 6-8 also provides for a method for cooling an electric energy storage device, comprising: adjusting a cooling level of the electric energy storage device based on battery state of charge being within a threshold state of charge of an end of a charge depletion mode. The method includes where adjusting the cooling level includes decreasing the cooling power level. The method includes where adjusting the cooling level is based on a temperature of the electric energy storage device at the end of the charge depletion mode, and where the temperature of the electric energy storage device at the end of the charge depletion period is based on electric energy storage device power during a charge sustain period. The method includes where adjusting the cooling level is based on an expected battery power during a battery charge sustaining period.

Note that the example control and estimation routines included herein can be used with various vehicle and powertrain configurations. The control methods and routines disclosed herein may be stored as executable instructions in non-transitory memory and may be carried out by the control system including the controller in combination with the various sensors, actuators, and other engine hardware.

Further, portions of the methods may be physical actions taken in the real world to change a state of a device. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example examples described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller. One or more of the method steps described herein may be omitted if desired.

It will be appreciated that the configurations and routines disclosed herein are exemplary in nature, and that these specific examples are not to be considered in a limiting sense, because numerous variations are possible. For example, the above technology can be applied to induction electric machines and permanent magnet electric machines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for cooling an electric energy storage device, comprising:
    determining a desired temperature range of the electric energy storage device at an end of a parking period;
    determining a desired temperature of the electric energy storage device at a start of the parking period based on the desired temperature range and an estimated ambient temperature at an expected parking location; and
    adjusting cooling of the electric energy storage device to one of a plurality of cooling power levels via a controller in response to an estimated distance between a vehicle and the expected parking location of the vehicle such that the electric energy storage device will be at the desired temperature at the start of the parking period;
    where adjusting cooling of the electric energy storage device includes adjusting a cooling power of one or more cooling devices that cool the electric energy storage device, and where adjusting cooling of the electric energy storage device includes:
        determining base temperature thresholds at which the vehicle adjusts the cooling power of the one or more cooling devices when the estimated distance between the vehicle and the expected parking location of the vehicle is greater than a threshold distance;
        determining offset values for each of the base temperature thresholds;
        for each base temperature threshold, adding the offset value to the base temperature threshold to determine an offset temperature threshold; and
        adjusting the cooling power of the one or more cooling devices in response to determining that a current temperature of the electric energy storage device reaches the offset temperature threshold.

2. The method of claim 1, where adjusting cooling of the electric energy storage device includes decreasing the cooling power of the one or more cooling devices.

3. The method of claim 1, where the expected parking location is determined via a navigation system.

4. The method of claim 1, where the adjusting is performed when an expected parking duration of a vehicle is greater than a threshold, and where the threshold varies as a function of ambient environmental temperature.

5. The method of claim 1, where the offset values are inversely proportional to a temperature of the electric energy storage device.

6. The method of claim 1, where the offset values are a function of a temperature of the electric energy storage device and the desired temperature.

7. The method of claim 1, where the plurality of cooling power levels includes a first cooling power level of natural heat transfer with no active cooling, a second cooling power level with activation of a coolant pump, and a third cooling power level with activation of a chiller.

8. A vehicle system, comprising: an electric energy storage device;
    a cooling device comprising at least one of a pump and a fan,
    the cooling device configured to extract thermal energy from
    the electric energy storage device; and
    a controller including executable instructions stored in non-transitory memory to: determine a predicted time to park based on a distance between a present location of a vehicle and an expected parking location of the vehicle;
    determine a predicted battery power usage during the predicted time to park;
    determine a desired electric energy storage device temperature at an end of a vehicle trip based on a duration of a parking period, an estimated ambient temperature of a parking location during the parking period, and a desired temperature of the electric energy storage device at an end of the parking period;
    calculate an average desired battery temperature change rate based on a difference between a present battery temperature and the desired temperature at the end of the vehicle trip divided by the predicted time to park;
    calculate an expected average heat transfer coefficient during the predicted time to park based on battery heat capacity, the predicted battery power usage, a coolant temperature, and the average desired battery temperature change rate; and
    adjust an amount of heat extracted from the electric energy storage device to one of a plurality of levels via the cooling device, the plurality of cooling power levels corresponding to predetermined heat transfer coefficient ranges, based on comparing the expected average heat transfer coefficient to the predetermined heat transfer coefficient ranges.

9. The vehicle system of claim 8, where the desired electric energy storage device temperature is based on an amount of charge received by the electric energy storage device while a vehicle is in park.

10. The vehicle system of claim 9, where the desired electric energy storage device temperature at the end of a vehicle trip is based on a temperature above which the electric energy storage device output power is reduced to less than a full power capability of the electric energy storage device.

11. The vehicle system of claim 8, further comprising additional instructions to adjust the amount of heat extracted from the electric energy storage device via the cooling device in response to an ambient environmental temperature.

12. The vehicle system of claim 8, where adjusting the amount of heat extracted from the electric energy storage device to one of the plurality of levels comprises adjusting to a first cooling level of the plurality of levels in response to determining that the expected average heat transfer coefficient falls within a first predetermined heat transfer coefficient range of the predetermined heat transfer coefficient ranges associated with the first cooling level.

13. The vehicle system of claim 8, where the predicted battery power usage during the predicted time to park is based on at least one of driver history, current route, vehicle operation mode, and accessory usage.

14. A method for cooling an electric energy storage device, comprising:

adjusting a cooling level of the electric energy storage device based on battery state of charge being within a threshold state of charge of an end of a charge depletion mode and an initiation of a charge sustain mode in which an engine is a primary actuator for vehicle driving, where adjusting the cooling level is based on a present electric energy storage device temperature and a plurality of temperature thresholds each corresponding to a respective electrical energy storage device cooling control level, and where the plurality of temperature thresholds are increased from base values, the electrical energy storage device cooling control levels comprising a first cooling control level, a second cooling control level, and a third cooling control level, where the second cooling control level comprises activation of a first set of cooling actuators or valves, and the third cooling control level comprises activation of a second set of cooling actuators or valves different from the first set of cooling actuators or valves.

15. The method of claim 14, where adjusting the cooling level includes decreasing the cooling power level.

16. The method of claim 14, where adjusting the cooling level is based on an estimated temperature of the electric energy storage device at the end of the charge depletion mode, and where the estimated temperature of the electric energy storage device at the end of the charge depletion period is based on an expected electric energy storage device power usage during a charge sustain period.

* * * * *